United States Patent Office 3,838,036
Patented Sept. 24, 1974

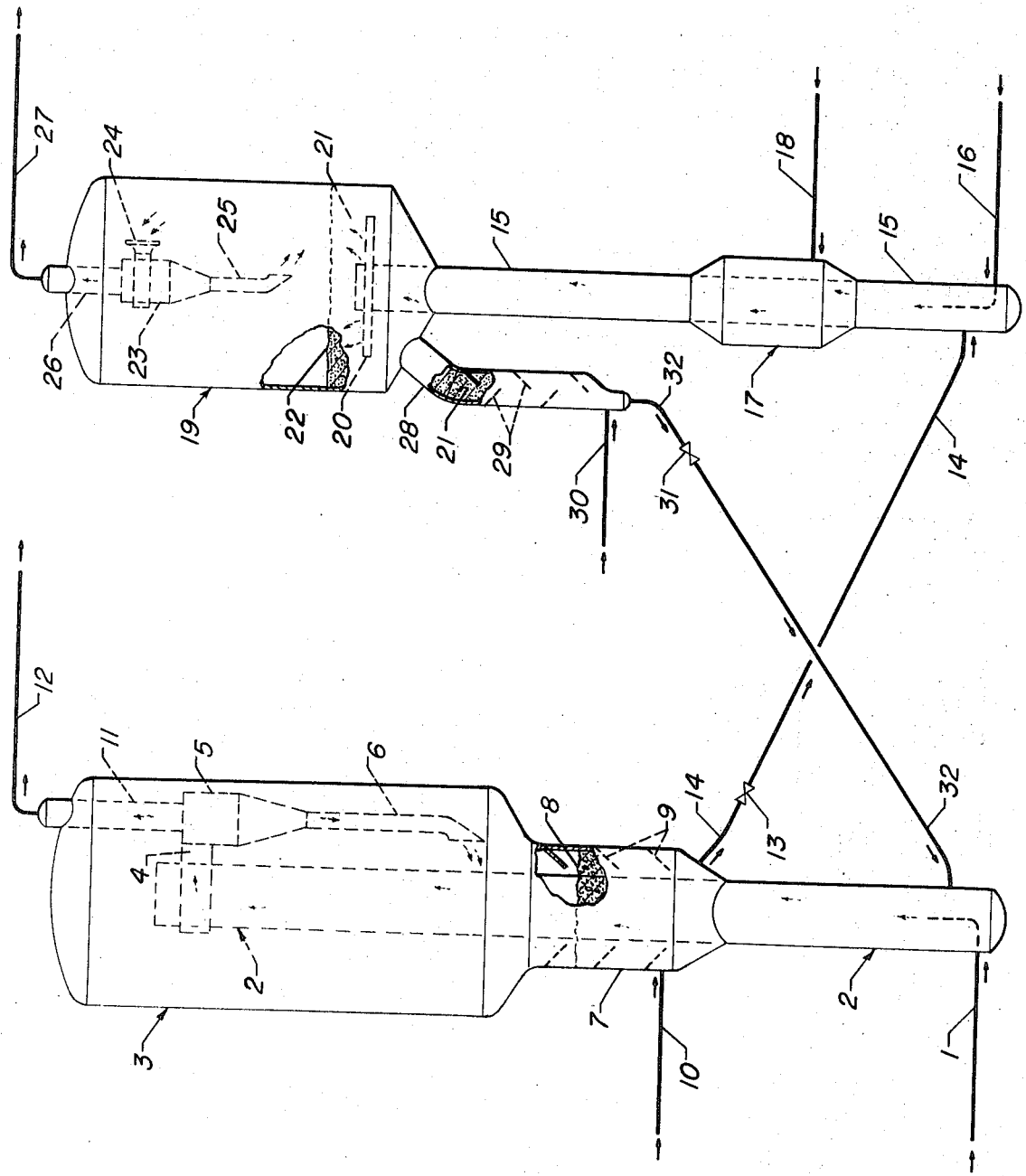

3,838,036
FLUID CATALYTIC CRACKING PROCESS EMPLOYING A CATALYST HEATING ZONE
Laurence O. Stine, Western Springs, and Charles L. Hemler, Jr., Mount Prospect, Ill., assignors to Universal Oil Products Company, Des Plaines, Ill.
Filed Nov. 29, 1972, Ser. No. 310,501
Int. Cl. B01j 9/20, 11/68; C10g 11/18
U.S. Cl. 208—120                                              10 Claims

ABSTRACT OF THE DISCLOSURE

A fluidized catalytic cracking process in which a catalyst, which has contacted a feedstock in a reaction zone and has thereby become coke-contaminated, is withdrawn from the reaction zone, passed to a catalyst heating zone, and then passed to a regeneration zone wherein coke is oxidized and from which catalyst is recycled back to the reaction zone.

In the process of our invention a catalyst and operating conditions are purposefully employed such that the amount of coke produced and subsequently oxidized is less than that needed to satisfy the process heat requirements for the desired choice of operating conditions. Process heat requirements for the desired choice of operating conditions. Process heat requirements are met by passing the zone which is fired by fuel less valuable than feedstock hydrocarbons which would otherwise be converted to coke. Because of the reduced coke yield of this process, which is purposefully lower than that required to fulfill the selected process heat balance requirements, higher yields of more valuable products are realized.

BACKGROUND OF THE INVENTION

Field of the Invention

The field of art to which this invention pertains is hydrocarbon processing. Specifically this invention relates to a fluid catalytic process in which higher yields of more valuable products are realized by reducing the yield of coke, which when oxidized supplies a portion of the process heat requirements, and by supplying the remainder of the process heat requirements by burning less desirable fuels in the catalyst heating zone through which the catalyst passes.

Prior Art

The fluid catalytic cracking process, despite its considerable age, is continuing to undergo a period of rebirth brought on by the advent of high activity zeolitic catalysts. Continued research and experience gained in the use of these catalysts have called for changes in the design and operation of both old and new FCC units to take advantage of the unique characteristics and features of zeolitic catalysts.

Such process changes have been in the broad areas of the reaction zone, the regeneration zone, and in the process heat balance. The principal reaction zone changes have been the conversion from bed to cocurrent short-time dilute-phase cracking, the reduction or elimination of recycle, and the trend toward higher temperature operations, all of which enhance the hagh activity of the zeolitic catalysts so that in most mases hydrocarbon residence times of 10 seconds or less are sufficient to achieve the desired degree of feedstock conversion. Since conversion can now be achieved in a much shorter time, the advantages of riser cracking over bed cracking lie primarily in an improved yield structure; secondary reactions of converted product to form coke and dry gas are greatly reduced. One trait of zeolitic-containing cracking catalysts is their susceptibility to selectivity change as carbon builds up on the catalyst. With these catalysts, increasing carbon not only reduces activity but also changes the yield distribution. An advantage, therefore, of lower coke production is not only that easier access of reactants to (and products from) zeolitic sites is maintained throughout the course of the reaction, but additionally that the desired yield distribution is therefore maintained. Another advantage of cocurrent short-time dilute-phase cracking is the feasibility of using high reactor temperatures with little or no gasoline cracking. These high temperatures result in increased olefin production which is desired for alkylate production and in higher gasoline octanes. Both of these benefits are increasingly important in the advent of low- or no-lead gasolines.

Regenerator design and operation changes have also been directed toward promoting hydrocarbon accessibility to the zeolites and maintaining favorable yield structures obtained with low coke on catalyst. Therefore such changes have been directed to provide low (0.05 to 0.15%) carbon-on-catalyst values with maximum utilization of air while still consistent with acceptable catalyst loss and catalyst deactivation. Design considerations generally include materials of construction to permit higher temperature and higher pressure regeneration as well as modifications to improve air distribution or possibly to permit staging. Operating conditions have been in the direction of obtaining higher coke burning rates and therefore low coke-on-catalyst values. There have been therefore recent industry trends toward high pressure and high temperature regenerators for this reason. Previously, the preferred pressure range had been from about 10 to about 25 p.s.i.g. and preferred temperatures had been in the 1100 to 1150° F. range. Pressures in the range of 30 to 40 p.s.i.g. and temperatures in the range of 1150 to 1250° F. or higher are now rather common.

These recent changes in design and operating conditions have not been made without effecting the process heat balance. Indeed, the greatly reduced coke yields realized by the combination of cocurrent short-residence-time dilute-phase cracking and high activity zeolitic catalysts have meant that heat sources in addition to the combustion of coke have been required to meet the total heat requirement for the desired high regenerator temperatures and high reaction temperatures.

This has generally been accomplished by putting additional heat into the fresh feed. This additional feed preheat has been obtained by rerouting heat exchangers; by modifying feed preheat furnaces; or, more generally, by installing new, bigger preheat furnaces. With older process designs which employed amorphous catalysts, the preheat temperatures were generally in the 300 to 600° F. range; now improved coke selectivities (lower coke on catalyst) are requiring that preheat temperatures be as high as possible without thermal cracking. This generally limits the preheat temperatures to about 700 to 850° F. depending upon the feed composition, residence time and hydrocarbon partial pressure.

With present feed preheat temperatures approaching this limit, most refiners are operating modern FCC units to reduce the yield of coke to that point at which process heat requirements are satisfied by the combustion of coke without additional outside fuel.

The present invention extends the state of the art through this "coke barrier." The prior art has not fully appreciated the desirability of further reducing coke yields below this barrier nor has it recognized the means by which this can be accomplished while still economically maintaining the process heat requirements. Thus the process of our invention breaks the dependence of the process heat balance upon the coke yield produced in the reaction zone and recognizes that a primary function of the regeneration zone is really to heat the catalyst. In one embodiment of the process of our invention, spent catalyst containing an amount of coke less than that required to meet the process heat requirements is passed through a catalyst heating zone and then to a regeneration zone where the minimal coke, deposited on the catalyst, is oxidized. The heating zone supplements the energy transferred to the catalyst as a result of coke oxidation so that the process heat requirements are met. In other words our process recognizes that other fuels may be more economically utilized to satisfy process heat requirements than valuable feedstock hydrocarbons which would otherwise be converted to coke. Our process provides the flexibility which is not presently available of operating below the present coke yield limitations as imposed by heat balance considerations, and of realizing therefrom the advantage of higher yields of more valuable products.

SUMMARY OF THE INVENTION

Our process can briefly be described as a fluid catalytic process in which: hydrocarbon feed and regenerated catalyst from the regeneration zone pass through a reaction zone in admixture at catalytic reaction conditions including the deposition of coke on the catalyst; catalyst is withdrawn from the reaction zone and passes to a catalyst heating zone; and, heated catalyst from the heating zone passes to a regeneration zone wherein coke is oxidized and from which catalyst is recycled back to the reaction zone. By passing the catalyst through a heating zone, reaction zone operating conditions may be employed which will produce an amount of coke that is insufficient when oxidized to supply the entire process heat requirements. That portion of the process heat requirement not supplied by coke oxidation is met by passing the coke-contaminated catalyst through a catalyst heating zone prior to the oxidation of coke in a regeneration zone.

Another broad embodiment of our invention can be summarized as a fluid catalytic cracking process employing a zeolite catalyst and certain operating conditions along with an operating sequence such that the yield of coke deposited on catalyst in a reaction zone is insufficient to supply the entire process heat requirements, one step of said sequence consisting of passing the coke-contaminated catalyst through a catalyst heating zone which supplies that amount of the process heat requirements not supplied by coke oxidation.

DESCRIPTION OF THE DRAWING

Having thus described the invention in brief general terms, reference is now made to the schematic drawing in order to provide a better understanding of the present invention. It is to be understood that the drawing is shown only in such details as are necessary for a clear understanding of the invention and that no intention is made thereby to unduly limit the scope of this invention. Various items such as valves, pumps, compressors, steam lines, instrumentation and other process equipment and control means have been omitted therefrom for the sake of simplicity. Variations obvious to those having ordinary skill in the art of fluid catalytic cracking processes are included within the broad scope of the present invention.

The schematic diagram shows a fluid catalytic cracking process basically containing a riser reaction zone 2, a catalyst heating zone 17, and a regeneration zone 19 with connecting conduits.

Hydrocarbon feed, which may be preheated by a heater or system of heat exchangers not shown, enters the lower end of reaction zone 2 through line 1 while hot regenerated catalyst enters the lower end of reaction zone 2 through line 32. Conversion of the feed takes place in the presence of catalyst while the feed and catalyst mixture passes upward through the reaction zone 2 which extends vertically into reception vessel 3. Reaction products plus unconverted feed, if any, pass out of reaction zone 2 via opening 4 directly in the cyclone separation means 5 which is housed within reception vessel 3.

Hydrocarbon vapors exit cyclone separation means 5 via line 11 and pass out of the reception vessel 3 via line 12. Although the drawing only shows one such cyclone separation means, it is contemplated that from one to four such cyclones could be positioned in reaction zone 2 near its upper portion. Additionally, second stage cyclone separation means could be housed within reception vessel 3 if necessary to achieve a higher degree of separation. Separated coke-contaminated catalyst leaves separation means 5 via dipleg 6 and is directed downward toward a spent catalyst stripper 7.

Stripper 7 has a catalyst level shown at 8 and has baffles 9 over which spent catalyst flows countercurrent to a stripping gas, generally steam, which enters stripper 7 via line 10. Stripped catalyst passes out of stripper 7 via spent catalyst conduit 14. Located on conduit 14 is valve 13 which may be used to control the level in stripper 7. Generally valve 13 is a slide valve and is operated by a reaction zone level controller.

Regenerator transport riser 15 receives spent catalyst from line 14 and fresh regeneration gas, generally air, via line 16 near its bottom portion. Fresh regeneration gas may be preheated by a heater or system of heat exchangers not shown on line 16. Transport riser 15 extends vertically through catalyst heating zone 17 and into regeneration zone 19. An external fuel such as absorber off gas enters heating zone 17 through line 18 and is burned within the heating zone to heat the catalyst and fresh regeneration gas that pass through the zone.

Heated fresh regeneration gas and catalyst exit the riser 15 through distributing device 20 into dense bed 21 which is maintained within the regeneration zone 19 and which has a level at interface 22. Typically the distributing device will be a metal plate containing holes or slots or preferably a pipe grid arrangement, both types of which are quite familiar to those skilled in the art. Although the drawing shows the catalyst maintained in a single dense bed, a multi-stage regeneration zone wherein coke is oxidized in more than one stage or bed is equally well suited to the process of this invention. The configuration of the regeneration zone or of the internal components of the regeneration zone is not critical to the process of our invention.

Although some small amount of coke oxidation will occur within the regeneration transport riser 15 and the catalyst heating zone 17, it is contemplated that the residence times in each will be too short to permit significant oxidation therein. The bulk of coke oxidation from the catalyst will occur in dense bed 21 where the residence time is sufficient for coke oxidation, thereby producing regenerated catalyst. As well, operating conditions can be chosen such that essentially complete oxidation of the CO, produced by the coke oxidation and available as a fuel to further heat the catalyst, will also take place in or just above the dense bed 21.

Cyclone separation means 23 is used to achieve a substantial separation of spent regeneration gas and entrained catalyst which pass out of bed 22. Although the drawing shows only one such cyclone separation means within the regeneration zone, it is contemplated that from one to four or more cyclones could be so positioned in series or parallel flow arrangements to achieve the desired degree of separation. It should of course be noted that separation means could as well be located outside the regeneration zone 19 on line 27 to separate catalyst from gas. Neither the arrangement nor the location of separation means is critical to the process of this invention. Entrained catalyst and regeneration gas enter cyclone separation means 23 through inlet 24. Regeneration gas essentially free of catalyst passes out of the separation means 23 through outlet 26 and paasses out of the regeneration zone 19 through line 27 while catalyst passes through dipleg 25 directed downward toward dense bed 21.

The catalyst in bed 21 moves in a downward direction and passes out of the regeneration zone 19 through stripper 28 which contains baffles 29. A striping medium will be admitted through line 30 to strip in a countercurrent fashion adsorbed and interstitial regeneration gas from the regenerated catalyst. Generally the stripping medium will be steam.

Stripped regenerated catalyst leaves stripper 28 through regenerated catalyst conduit 32 and is directed to the bottom of the riser reaction zone 2 as previously mentioned. Located on conduit 32 is valve 31 which may be used to control the rate of withdrawal of regenerated catalyst from stripper 28. Valve 31 is typically a slide valve and is operated by a reactor temperature controller.

DESCRIPTION OF THE INVENTION

The zeolite-containing catalyst are preferred for the process of this invention because their higher activity permits substantial conversion with lower coke production as compared to the amorphous catalysts. There could be circumstances, however, in which a fluid catalyst cracking process employing an amorphous catalyst would produce insufficient coke to satisfy the process heat requirements at desired reaction conditions. Such circumstances might include the processing of a very light feedstock or the selection of mild cracking conditions to produce low coke. To such circumstances the process of the present invention in its broadest embodiment would apply: catalyst from the reaction zone would pass through a catalyst heating zone and then to a regeneration zone such that in combination the process heat requirements would be satisfied.

The higher activity catalyst allows the use of cocurrent short-residence-time dilute-phase reaction zones of the type presently in use in modern FCC units. Cocurrent short-residence time dilute-phase reaction zones as used herein means the cracking reaction zone which is characterized by the absence of a dense catalyst bed, by cocurrent flow of catalyst and hydrocarbon, and by short catalyst residence time. This high activity is such that in most cases hydrocarbon residence times of less than 10 seconds are sufficient to achieve the desired degree of feedstock conversion. Reaction conditions employed will include a temperature between about 900° F. and 1100° F., a pressure of about atmospheric to about 40 p.s.i.g. and a catalyst residence time of less than 10 seconds. Since conversion can now be obtained in a much shorter time, secondary reactions of converted products to form coke and dry gas are greatly reduced.

As a consequence of reduced secondary reactions, the concentration of highly condensed ring structures found in the coke deposit has been reduced and the hydrogen content of the coke has increased. We have found that hydrogen-rich adsorbed material can be removed with additional stripping and thus a larger fraction of the coke can be removed by stripping further reducing the coke on spent catalyst. Depending upon catalyst, feedstock, and operating conditions employed, the catalyst residence time within the stripper will be from about 30 seconds to about 3 minutes and the rate of stripping steam from about 1 to about 15 pounds per 1000 pounds of catalyst. The process of this invention in one embodiment requires stripping of spent catalyst as one means of reducing coke on catalyst.

As an additional means of avoiding or minimizing secondary reactions which lead to increased coke, the importance of a quick separation of hydrocarbon and catalyst has previously been recognized. Indeed, if timely separation of hydrocarbon and catalyst does not occur before the occurence of a significant amount of aftercracking, at least a portion of the selectivity advantage of the zeolite catalyst and the cocurrent short-time dilute-phase riser cracking zone can be lost. The process of this invention in one embodiment requires substantially instantaneous separation of catalyst and hydrocarbon as these materials exit from the reaction zone as another means of reducing the coke yield.

The location of the catalyst heating zone will be anywhere between the reaction zone and the zone wherein the majority of coke from the spent catalyst is oxidized such that a mixture of catalyst and fresh regeneration gas passing through the zone can be heated to the particular temperature required by the process heat requirements. The physical makeup of the heating zone is not critical to this invention and may be, for instance, of the fired heater type commonly used in the refinery industry. Any refinery fuel of the type commonly used to fire reboilers and furnaces may be used as fuel for this heating zone. A particularly preferred fuel is the absorber gas which is produced as an FCC product stream from a gas concentration process located downstream from the FCC process. This stream is of low commercial value and is commonly used within the refinery as part of the fuel gas.

The regeneration zone is where coke is oxidized from the spent catalyst in the presence of fresh regeneration gas to produce regenerated catalyst. Spent catalyst as used in this specification is catalyst which has been contaminated with coke in a reaction zone and regenerated catalyst is catalyst from which essentially no more coke will be removed. The term regeneration gas shall mean in a generic sense, any gas which is to contact or which has contacted catalyst within the regeneration zone. Specifically, the term fresh regeneration gas shall include any oxygen-containing gas such as air or oxygen enriched or deficient air which passes into the regeneration zone to allow oxidation of coke within the regeneration zone.

Spent catalyst entering the regeneration zone generally contains from about 0.5 to about 1.5 wt. percent coke and regenerated catalyst will generally contain less than about 0.5 wt. percent coke and usually from about 0.03 to 0.35 wt. percent cake. The direction of the past several years has been to strive for lower and lower levels of residual coke on regenerated catalyst so that the regenerated catalyst returned to the reaction zone has maximum activity, that is, good accessibility to zeolitic sites.

To achieve these lower coke levels, changes have been made in regeneration zone operations to improve the coke burning rate so that the low coke levels can be achieved in the allotted residence time within the regeneration zone. Such operating conditions are high partial pressure of oxygen and high temperatures. There have been, therefore, recent industry trends toward higher pressure and higher temperature regeneration zones for this reason. Previously the preferred pressure range had been about 10 to about 25 p.s.i.g. and preferred temperatures had been in the range of about 1150 to 1250° F. Pressures in the range of 30 to 40 p.s.i.g. and temperatures in the range of 1250 to 1400° F. are now rather common.

Generally the regeneration (coke oxidation) is done in a single dense bed maintained in the bottom portion of the regeneration zone and provisions are made for recovering and returning to the dense bed catalyst entrained in the flue gas effluent which passes from the dense bed. This is generally accomplished by passing the effluent flue gas containing entrained catalyst through cyclone separation means located in the disengager space which is positioned above and in connection with the dense bed. Attempts to achieve low residual carbon levels on regenerated catalyst and to reduce catalyst inventories and fresh catalyst makeup rates have been made by effecting a staged regeneration within a regeneration vessel. Such staging has involved various combinations of two or more dense beds with one or more dilute phase regions.

Either a single or multi-stage type of regeneration zone may be used in the process of our invention. For either type it is preferred that CO resulting from the oxidation of coke be essentially completely oxidized within the regeneration zone. This oxidation of a fuel already available as a product of the coke oxidation will not only supply needed additional heat to the catalyst but will essentially eliminate an air pollution problem without the need for rather expensive CO boilers. Additionally it will allow feed preheat temperatures to be reduced which is especially important when such temperatures are approaching thermocracking temperature limitations. Preferred regeneration zone temperatures to maintain satisfactory rates of coke and CO oxidation are temperatures of at least 1200° F. and preferably from about 1200° F. to 1400° F.

the concept upon which this invention is based and terms used in connection with it.

TABLE NO. I.—FCC YIELD COMPARISON

| Technology | Operation | | | | |
|---|---|---|---|---|---|
| | 1 | 2 | 3 | 4 | 5 |
| | Amorphous catalyst, dense bed reaction zone | Zeolite catalyst, dense bed reaction zone | Zeolite catalyst, cocurrent short-time dilute-phase quick-separation reaction zone | Features of 3 plus CO oxidation within regeneration zone | Features of 4 plus catalyst heating zone |
| Conversion, LV% | 79.2 | 85 | 85 | 85 | 85 |
| Yields: | | | | | |
| Alkylation feed, LV% ($C_3$–$C_4$) | 24.9 | 29.4 | 27.7 | 30.5 | 33.2 |
| Gasoline, LV% ($C_5$–380° F. at 90%) | 58.4 | 63.1 | 66.4 | 67.1 | 68.2 |
| Total cycle oil, LV% | 20.8 | 15.0 | 15.0 | 15.0 | 15.0 |
| Coke, wt. percent | 8.6 | 8.5 | 6.3 | 5.0 | 3.1 |
| Potential alkylate, LV%* | | 29.2 | 30.2 | 32.8 | 36.0 |
| Total 10 RVP gasoline, LV% | | 102.2 | 108.8 | 110.2 | 113.9 |
| Gasoline octane (research + 0 cc TEL) | 89.4 | 91 | 92 | 92.5 | 92.5 |

*90% $C_3$= Recovery.

Consistent with the desire for minimum catalyst inventory, it is preferred that the catalyst residence time within the regeneration zone be about 5 minutes or less and more preferably within the range of about ½ to 5 minutes. The pressures contemplated for use in the regeneration zone of this invention are from about normal atmospheric pressure up to about 50 p.s.i.g. with the preferred range being from about 10 to about 40 p.s.i.g.

It is desirable, although not necessary, that regenerated catalyst be stripped of adsorbed and interstitial flue gas components prior to being returned to the reaction zone. By stripping the regenerated catalyst, flue gas components will be carried out of the regeneration zone with the bulk of the flue gas instead of being carried through the reaction zone and becoming a substantial part of the absorber off gas product stream. Without these components in the reaction zone effluent, substantial savings can be realized by using a less expensive gas concentration plant, that is, one having smaller compressors and smaller absorber columns along with other gas handling equipment. As well, the adsorber off gas, which can be used as a fuel for the catalyst heating zone, will have a higher heat content. When such stripping of regenerated catalyst is provided the bed volume in the stripper will be so sized as to allow minimum catalyst exposure time at high temperatures.

Coke has generally been recognized, along with absorber off gas, as the least valuable product produced by the FCC process and has been recognized as desirable only as a fuel which when oxidized in the regeneration zone would supply the process heat requirements. Coke on catalyst in excess of that required to supply the energy requirement represents an economic debit to the process since that coke represents feedstock which was not recovered in the form of more valuable products and which was, moreover, simply burned in the regeneration zone. Items of FCC technology such as new zeolite cracking catalysts, cocurrent short-time dilute-phase quick-separation reaction zones, and CO oxidation within the regeneration zone have contributed to reducing coke on catayst to more closely approach that amount actually required for heat balance considerations. The process of our invention makes possible a further reduction.

The operations shown in Table No. I make clearer both

Operation 1 shown in the table is typical of an FCC operation of several years ago that employed amorphous catalyst in a dense bed reaction zone. At a conversion of 79.2 LV%, a gasoline yield of 58.4 LV% and a coke yield of 8.6 wt. percent were produced.

Operation 2 shows the effect of a change from an amorphous to a zeolitic catalyst and is typical of FCC operations of 2–3 years ago. Note that at about the same coke yield as that of the amorphous catalyst operation, a higher conversion of 85% was possible along with higher yields of more valuable products: 63.1 LV% gasoline with an octane of 91 and 29.4 LV% $C_3$'s and $C_4$'s for alkylation feed. The olefins in the $C_3$–$C_4$ product represent a potential alkylate yield of 29.2 LV%. Alkylation processes such as HF alkylation and $H_2SO_4$ alkylation are in common use in the petroleum refining industry. The total yield of gasoline having a Reid vapor pressure of 10 p.s.i.g., representing FCC gasoline and potential alkylate, and butane for vapor pressure control, was 102.2 LV%. With the relatively large amount of coke available in both Operations 1 and 2 (about 8.5 wt. percent) to satisfy the process heat requirements, little or no feed preheat was required.

The increased efficiency of the cocurrent short-time dilute-phase quick-separation reaction zone as opposed to the dense bed reaction zone is shown in Operation 3. FCC gasoline yield has been increased to 66.4 LV%, at a higher octane of 92, with a corresponding decrease in coke yield to 6.3 wt. percent for the same conversion. Total 10 RVP gasoline yield has increased to 108.8 LV% due to increased FCC gasoline and alkylate yields (olefinicities of $C_3$'s and $C_4$'s are higher). With the low coke yield produced, however, more feed preheat has been required to meet the process heat requirements and in fact the feed preheat temeperature has approached the maximum, that is, the temperature at which thermal cracking begins.

This operation then has reached the lowest coke yield which, with near-maximum feed preheat, will satisfy the process heat requirements. The term "process heat requirement" as used in this specification is therefore that amount of heat demanded by the process for any set of operating conditions. For each set of desired operating conditions a specific amount of heat from whatever source or sources will be necessary to achieve those conditions. It is apparent that a reduction in coke yield while at the same time maintaining the desired temperatures is not possible without an additional source of fuel or an additional heat source. Certainly a further decrease in coke would be justified if that decrease were recovered in the form of more valuable products and if the process heat requirements could be met with a combination of coke and a fuel having value no higher than that of coke.

The goal then is to divorce regeneration zone operation from the coke yield which is produced by the reaction zone and to begin to think of "regeneration" in terms of one of its primary functions, namely that of producing heat and transferring that heat to the catalyst.

Such a low-value fuel is utilized in operation 4. Carbon monoxide, which is produced by the oxidation of coke, is utilized within the regeneration zone where it is produced as a fuel supplementing coke to meet the process heat requirements. Normally the CO as part of the flue gas is directed to a CO boiler located downstream from the FCC process and the heat of combustion is not recovered by the FCC process but is used to make steam. The coke yield as shown has therefore been further reduced to 5.0 wt. percent and at the same conversion more FCC gasoline (67.1 LV%) and potential alkylate (32.8 LV%) has been produced. Operating conditions possible under this scheme resulted in a further increase in FCC gasoline octane to 92.5 and an increase in total 10 RVP gasoline to 110.2 LV%. At the same time, utilization of the CO as a fuel within the FCC process permitted feed preheat temperatures to be reduced to more moderate levels away from thermal cracking temperatures.

Some refiners have supplied relatively small amounts of additional fuel that they may require for heat balance considerations in the form of torch oil to the regeneration zone. The use of torch oil in the regeneration zone dense bed over sustained periods of time is generally not recommended, however, since there is some evidence that hydrothermal deactivation of the catalyst results and, as well, the small amounts used do not make possible further significant reductions in coke yield.

In a similar manner additional fuel might be supplied by charging to the process a heavier feed, that is, one having a higher Conradson carbon content. Unfortunately, when the Conradson carbon is increased, so also are contaminant metals such as nickel, iron, and vanadium. The effect of these metals is a significant increase in hydrogen production which must be handled by (and which can cause problems in) gas concentration equipment such as condensers, compressors, and absorbers located downstream of the reaction zone. Generally refinery practice has been to maintain the hydrogen production, as characterized by the ratio of the amount of hydrogen produced to the amount of methane produced, to a value less than one by increasing fresh catalyst addition rates and/or reducing metals in the feed through improved feed preparations procedures.

Operation 4 then has about reached the "coke barrier," that is, the lowest coke yield, which with the feed preheat temperature within acceptable limits and with the use within the process of an internally generated fuel, will satisfy the process heat requirements.

The process of our invention provides a means of adding additional heat to the FCC process by employing a catalyst heating zone and therefore makes possible a process having the capability and flexibility of operating below the "coke barrier." Increased yields of the more valuable products are thereby realized as indicated in Operation 5 of Table No. I. Note the continued increase in FCC gasoline and potential alkylate as coke from raw oil feed is diminished.

In this operation every effort was made to employ design considerations and operating conditions that would achieve a minimum yield of coke without regard to that coke yield necessary for heat balance of the process. Such design considerations and operating conditions include: a limit on the Conradson carbon content of the feed to a level generally consistent with good commercial FCC practice, the use of a zeolite catalyst in a cocurrent short-time dilute-phase quick-separation reaction zone, increased stripping of spent catalyst, CO oxidation within the regeneration zone, reasonable feed preheat temperatures, and the use of a catalyst heating zone.

The amount of coke required to be oxidized to satisfy the process heat requirements for any set of operating conditions can be calculated by energy balance around the process. For the operating conditions of Operation 5 in Table No. I that calculated amount of coke was about 3.5 wt. percent. The 3.1 wt. percent coke yield actually produced by this operation is therefore less than that required to supply the entire heat requirement. The amount of additional heat required was supplied by firing fuel in the catalyst heating zone.

The fuel for the catalyst heating zone may be absorber off gas or perhaps slurry oil, both of which are produced by the FCC process, or an external refinery fuel. The choice is not critical but economics will show that it is advantageous to use the lower value material for fuel rather than produce coke from high value raw feed.

We claim as our invention:

1. A fluid catalytic cracking process which comprises the steps of:
    (a) contacting a regenerated catalyst with a hydrocarbon feed in a cocurrent short-time dilute-phase reaction zone;
    (b) passing said mixture of feed and catalyst through said reaction zone at reaction conditions, including the deposition of coke on said catalyst, and discharging said mixture into a separation means which effects the separation of catalyst from hydrocarbon vapors;
    (c) passing said separated catalyst to a catalyst heating zone wherein a predetermined amount of heat is added by indirect heat exchange with said catalyst; and,
    (d) passing said heated catalyst to a regeneration zone, maintained at oxidizing conditions, and oxidizing coke from said catalyst to produce regenerated catalyst.

2. The process of Claim 1 further characterized in that the amount of coke deposited on said catalyst at desired reaction conditions, when oxidized in said regeneration zone, is insufficient to supply the entire process heat requirements.

3. The process of Claim 1 further characterized in that the predetermined amount of heat is that sufficient along with heat supplied by coke oxidation to supply the process heat requirements.

4. The process of Claim 1 further characterized in that said oxidizing conditions include a temperature within the range of about 1200° F. to 1400 °F., a residence time of about ½ to about 5 minutes, and the essentially complete oxidation of CO, resulting from the oxidation of coke, to $CO_2$.

5. The process of Claim 1 further characterized in that said reaction conditions include a temperature between about 900 and 1100° F., a pressure within the range of about atmospheric to 40 p.s.i.g., and a residence time of less than 10 seconds.

6. A fluid catalytic cracking process in which the amount of coke deposited on catalyst in a reaction zone maintained at desired reaction conditions, would be insufficient if alone oxidized in a regeneration zone to meet process heat requirements, said process comprising the steps of:
    (a) contacting a fluid zeolitic cracking catalyst with a hydrocarbon feed in a cocurrent short-time dilute-phase reaction zone maintained at reaction conditions including a temperature of between 900 to 1100° F., a pressure within the range of about atmospheric to 40 p.s.i.g., and a residence time of less than 10 seconds;
    (b) discharging the catalyst and hydrocarbon stream from said reaction zone outlet to a separation means and thereby separating spent catalyst from hydrocarbons;
    (c) stripping said separated catalyst, maintained in a dense bed for a residence time within the range of about 30 seconds to about 3 minutes, with steam at a rate of about 1 to about 15 pounds per 1000 pounds of catalyst;

(d) passing said stripped catalyst, along with a fresh regeneration gas to a catalyst heating zone and therein burning in indirect contact with catalyst sufficient combustible fluid such that process heat requirements can be met; and, (e) oxidizing, in a regeneration zone maintained at oxidizing conditions including a temperature in the range of 1150° F. to 1500° F., said coke from said heated catalyst as well as CO, resulting from the oxidation of coke, to produce regenerated catalyst.

7. The process of Claim 6 further characterized in that said combustible fluid is absorber off gas produced by the fluid catalytic cracking process.

8. The process of Claim 6 further characterized in that said oxidizing conditions include a residence time of less than two minutes.

9. The process of Claim 6 further characterized in that said regenerated catalyst, maintained in a dense bed, is stripped with steam.

10. The process of Claim 6 further characterized in that said amount of coke is less than 4 wt. percent of fresh feed.

References Cited

UNITED STATES PATENTS

| | | | |
|---|---|---|---|
| 2,422,501 | 6/1947 | Roetheli | 23—262 |
| 2,445,351 | 7/1948 | Gohr | 208—159 |
| 2,451,619 | 10/1948 | Hengsterbeck et al. | 208—150 |
| 2,619,473 | 11/1952 | Wurth et al. | 252—417 |
| 3,012,962 | 12/1961 | Dygert | 208—154 |
| 3,661,799 | 5/1972 | Cartmell | 252—417 |

DELBERT E. GANTZ, Primary Examiner

G. E. SCHMITKONS, Assistant Examiner

U.S. Cl. X.R.

23—288 S; 208—153, 164; 252—417